S. T. SHULTS.
TIRE INFLATING DEVICE.
APPLICATION FILED NOV. 1, 1916.
1,251,829.
Patented Jan. 1, 1918.
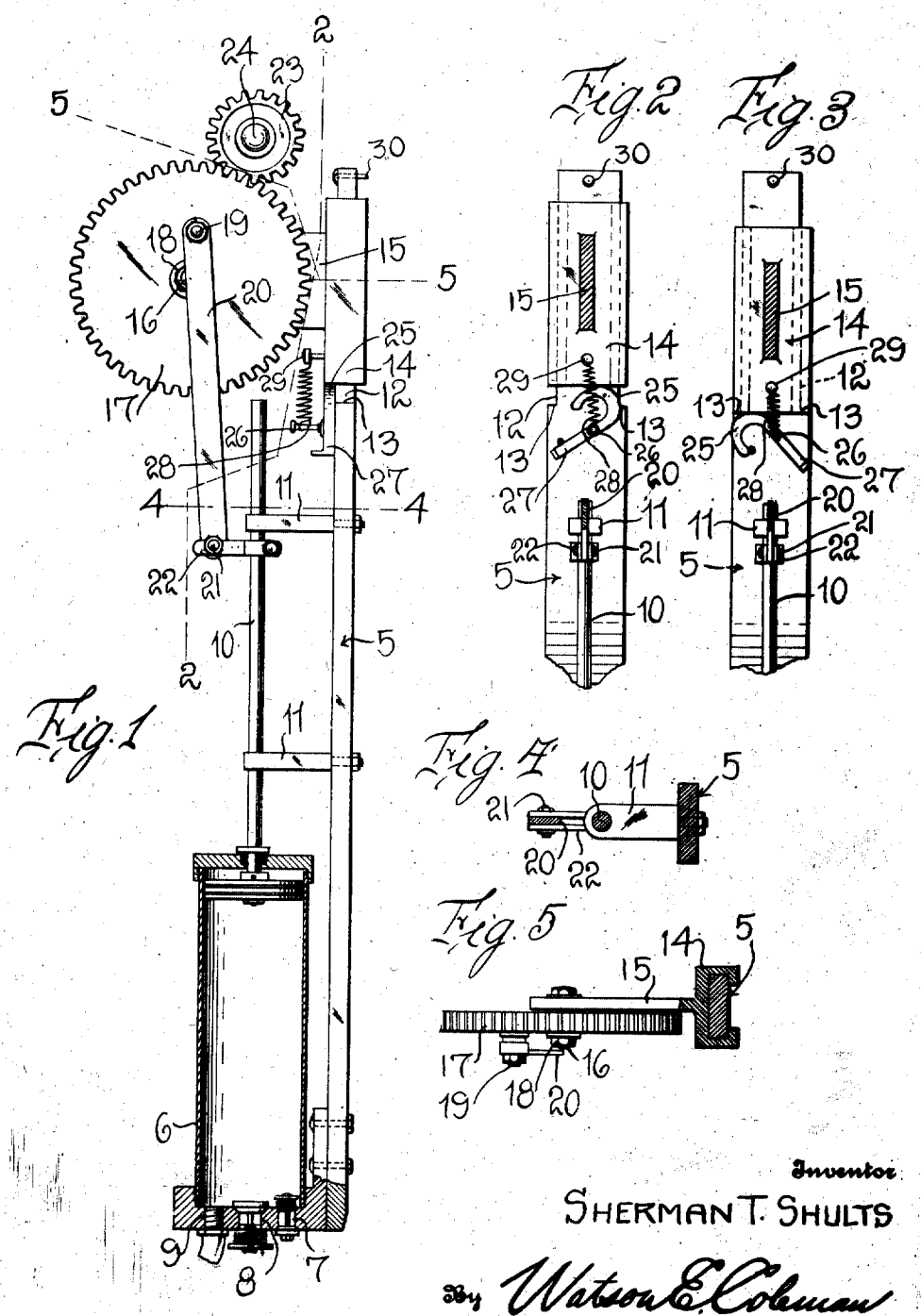

UNITED STATES PATENT OFFICE.

SHERMAN T. SHULTS, OF McCAMMON, IDAHO.

TIRE-INFLATING DEVICE.

1,251,829.        Specification of Letters Patent.        Patented Jan. 1, 1918.

Application filed November 1, 1916. Serial No. 128,953.

*To all whom it may concern:*

Be it known that I, SHERMAN T. SHULTS, a citizen of the United States, residing at McCammon, in the county of Bannock and State of Idaho, have invented certain new and useful Improvements in Tire-Inflating Devices, of which the following is a specification, reference being had to the accompany drawings.

This invention relates to certain improvements in tire inflating devices and more particularly to an improved operating gearing for a tire inflating pump, the invention having for its primary object to provide simple and effective means for operatively connecting the actuating gearing for the pump with an operating gear driven from the vehicle engine.

It is another and more particular object of the invention to provide a fixed plate or support upon which the pump is mounted, an arm longitudinally adjustable upon said support, an actuating gear rotatably mounted upon the arm and operatively connected to the pump piston, and manually operable means mounted upon the support and coacting with the arm to operatively engage the gear carried thereby with the driven gear.

It is still another general object of the invention to improve and simplify the construction of devices of the above character, whereby the same may be operated with great facility and convenience to quickly pump up the tires of a vehicle to the desired pressure.

With the above and other objects in view, my invention consists in the novel features of construction, combination and arrangement of parts to be hereinafter more fully described, claimed and illustrated in the accompanying drawing, in which, Figure 1 is a side elevation illustrating the preferred mounting and arrangement of my improved actuating means for the tire pump;

Fig. 2 is a section taken on the line 2—2 of Fig. 1;

Fig. 3 is a similar view showing the adjustable arm in its lowered position upon the support;

Fig. 4 is a section taken on the line 4—4 of Fig. 1; and

Fig. 5 is a section taken on the line 5—5 of Fig. 1.

Referring in detail to the drawing, 5 designates the plate or support which is suitably mounted in the supporting frame of the vehicle, and upon the lower end of this support and in parallel relation thereto, the pump cylinder, indicated at 6, is arranged. This pump cylinder may be mounted upon the frame or supporting plate in the manner disclosed in a co-pending application filed October 18, 1916, Serial Number 126,354, so that said cylinder can be readily removed for the purpose of repairing the pump valve. For the purposes of the present explanation, it will suffice to state that the pump cylinder 6 is provided in its base with an air escape port or outlet 7, and a valved air inlet port 8 and a port 9 for the connection of a flexible inflating tube therewith. The escape port 7 is preferably equipped with a spring-held valve normally closing the same, and suitable adjusting means for the spring, whereby the air pressure within the vehicle tires may be regulated as desired. The usual piston is arranged to reciprocate within the cylinder 6 and the piston rod, indicated at 10, extends through the top of the cylinder and in parallel relation to the support 5. Spaced guides 11 are adjustably mounted in the support, through which the piston rod 10 is loosely disposed.

Upon one end of the supporting bar or plate 5 which is somewhat reduced in width, as at 12, to provide shoulders 13 on the opposite edges of said bar, a channeled plate 14 is longitudinally movable. A laterally projecting arm 15 is integrally formed with this plate, and in the end thereof a stud or gudgeon 16 is rigidly fixed. Upon this gudgeon, the gear 17 is rotatably mounted and held against longitudinal shifting movement by a cap nut 18 or any other suitable means. 19 designates a wrist pin fixed in the gear 17, to which one end of a pitman 20 is loosely connected. The other end of this pitman is loosely engaged upon a bolt 21 engaged between the spaced arms of a yoke member 22 which is securely clamped upon the piston rod 10. The gear 17 is adapted to coöperatively engage with a driving gear or pinion 23 secured upon a shaft 24 which is suitably geared to the motor of the vehicle.

Upon one side of the supporting bar 5 adjacent to its reduced end, a cam member 25 is pivotally mounted upon a stud bolt 26 fixed in the support. This cam element is provided with a lever 27, by means of which it may be conveniently actuated. To the projecting end of the bolt 26, one end of a coil spring 28 is attached, the other end of said spring being secured to a pin 29 fixed in the sliding plate 14. In one end of the supporting bar 5, a bolt 30 is threaded and acts as a stop to limit the movement of said slide plate 14 in one direction. It will be understood that normally, the other end of this plate rests upon the shoulders 13.

In the operation of the device, the air hose or tube connected to the port 9 is attached in the usual manner to the inflating valve of one of the wheel tires, and the operator then shifts the lever 27 from the dotted-line position seen in Fig. 3 to the full-line position so that the cam 25 co-acting with the lower edge of the plate 14 forces said plate longitudinally upon the supporting bar 5 and moves the gear wheel 17 into operative engagement with the positively driving gear 23. It is understood, of course, that the tires are inflated by means of my improved mechanism only when the vehicle is stationary. In the operation of the vehicle engine, the clutch being in neutral position, the pump piston is positively reciprocated through the medium of the pitman connection 20 to the gear wheel 17, and air is alternately drawn into and expelled from the cylinder 6. In each expulsion of the air, it is conducted through the tube or hose to the inflatable tube of the tire, and when the pressure in the tire reaches a predetermined point, the air will escape through the port 7. The air conducting hose or tube may be successively connected to the tires of the several wheels and all of said tires quickly pumped up to maximum pressure in the manner above described. After pumping up the tires, the lever 27 is actuated to shift the cam 25 and permit the plate 15 to move upon the supporting bar 5, thereby disengaging the gear wheels 17 from the driving gear 23 and stopping the operation of the pump.

From the foregoing description, taken in connection with the accompanying drawing, the construction, manner of operation and several advantages of the invention will be clearly and fully understood. While the device is exceedingly simple, it is, at the same time, highly convenient and serviceable in practical use and affords means for easily and quickly effecting an operative connection between the tire inflating pump and the vehicle engine. The pump and operating gearing may be readily mounted upon the ordinary motor vehicle without necessitating any material alterations therein. It is manifest, of course, that the supporting bar 5 may be secured in position by any desired means and this plate may also be of various other forms than that illustrated in the drawing. The several coöperating elements of the mechanism are also susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a support and an air pump mounted thereon, of a member longitudinally slidable on the support, a driven element rotatably mounted upon said member, means operatively connecting said element to the pump piston, a driving element, a spring connected to the slide member and urging the same in one direction upon the support to normally hold the driven element out of operative engagement with the driving element, and manually operable means mounted upon the support to co-act with said shiftable member and move the same against the action of the spring to engage the driven element with the driving element.

2. The combination with a support and an air pump mounted thereon, of a member longitudinally slidable upon the support, said support having stop shoulders limiting the movement of said member in one direction, a driven element rotatably mounted upon said member, means to operatively connect said element to the pump piston, means yieldingly urging the slide member into engagement with the stop shoulders and normally holding the driven element out of operative engagement with the driving element, a manually operable cam mounted upon the support and adapted to co-act with said slidable member to shift the same and operatively engage the driven element with the driving element, and means fixed to the support with which the cam co-acts to limit the movement of the latter and retain the same in its effective position.

In testimony whereof I hereunto affix my signature in the presence of two witnesses.

SHERMAN T. SHULTS.

Witnesses:
FRANCES CROSHAW,
H. McCAMELL.